United States Patent
Herloski et al.

(10) Patent No.: US 7,586,082 B2
(45) Date of Patent: Sep. 8, 2009

(54) OPTICAL ELEMENT FOR A DOCUMENT ILLUMINATOR

(75) Inventors: Robert P. Herloski, Webster, NY (US); Jagdish C. Tandon, Fairport, NY (US); Douglas E. Proctor, Gates, NY (US); Stephen J. Wenthe, Jr., West Henrietta, NY (US); Eugene A. Rogalski, Jr., Penfield, NY (US); Jeffrey L. Baniak, Penfield, NY (US); Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 106 days.

(21) Appl. No.: 11/657,182

(22) Filed: Jan. 24, 2007

(65) Prior Publication Data

US 2008/0173799 A1    Jul. 24, 2008

(51) Int. Cl.
*H01J 3/14* (2006.01)
*G01J 1/04* (2006.01)
*G02B 6/42* (2006.01)
*G21K 1/00* (2006.01)

(52) U.S. Cl. .................... 250/216; 250/227.14; 385/31; 378/145

(58) Field of Classification Search ............... 250/216, 250/208.1, 234, 235, 559.22, 227.11, 227.14; 385/50, 133, 31, 32, 54, 69; 358/473–475, 358/509; 356/376; 362/249, 310, 606, 610; 378/145
See application file for complete search history.

(56) References Cited

U.S. PATENT DOCUMENTS

| | | | | | |
|---|---|---|---|---|---|
| 4,711,972 | A | * | 12/1987 | O'Neill | 136/246 |
| 4,739,159 | A | * | 4/1988 | Inokuchi | 250/216 |
| 4,898,450 | A | * | 2/1990 | Jannson et al. | 385/50 |
| 5,686,720 | A | * | 11/1997 | Tullis | 250/208.1 |
| 5,727,108 | A | * | 3/1998 | Hed | 385/133 |
| 6,939,009 | B2 | * | 9/2005 | Fischer et al. | 353/43 |
| 2006/0098247 | A1 | | 5/2006 | Sawada | |
| 2008/0055674 | A1 | | 3/2008 | Wilsher et al. | |

FOREIGN PATENT DOCUMENTS

| EP | 0534853 | 3/1993 |
|---|---|---|
| EP | 1615419 A | 1/2006 |
| JP | 2001077975 A | 3/2001 |

* cited by examiner

*Primary Examiner*—Georgia Y Epps
*Assistant Examiner*—Don Williams
(74) *Attorney, Agent, or Firm*—Simpson & Simpson, PLLC

(57) ABSTRACT

An apparatus for recording an image on a sheet comprises a linear array of light sources and an optical element for transmitting light emitted from the light sources. The optical element comprises a light-transmissive member, having an entry surface for disposal near the light sources. The entry surface defines at least one set of prisms. The optical element can further define a DCPC (dielectric compound parabolic concentrator) in cross-section. Collection optics, such as a SEL-FOC® lens, receives light reflected from the sheet. Each prism of the optical element defines an angle whereby light exiting the optical element is outside the acceptance angle of the collection optics.

18 Claims, 3 Drawing Sheets

OPTICAL ELEMENT FOR A DOCUMENT ILLUMINATOR

INCORPORATION BY REFERENCE

The following co-pending applications are hereby incorporated by reference in their entireties: U.S. application Ser. No. 11/409,109, filed Apr. 21, 2006, now U.S. Publication No. 20070247677; and U.S. application Ser. No. 11/513,742, filed Aug. 31, 2006, now U.S. Publication No. 20080055674.

TECHNICAL FIELD

The present disclosure relates to an illuminating apparatus used to illuminate hard-copy documents for digital recording, such as in digital scanners, facsimile machines, and digital copiers.

BACKGROUND

In office equipment, such as digital copiers and facsimile machines, original hard-copy documents are recorded as digital data using what can be generally called a "scanner." In a typical scanner, a document sheet is illuminated and the light reflected from the document sheet is collected by a SELFOC® or a spherical lens and it is recorded by a photosensitive device such as a CCD (charge coupled device) or CMOS (complementary metal oxide semiconductor) array, to be converted to digital image data. In one embodiment, a narrow strip of the document sheet is illuminated as the sheet is moved through a document handler, or the photosensitive device is moved relative to a platen on which the document sheet is placed.

One type of illuminator useful in document scanning includes a light-transmissive element that exploits internal reflections to direct light from one or more point sources, such as light emitting diodes (LEDs) to emerge from an exit surface of the element toward a document. Designing an illuminator for a scanner presents challenges in providing, among other aspects, an even illumination along the narrow strip of the document, as well as providing a suitable illumination profile across the narrow strip.

The angular distribution of light produced by the illuminator at the document can vary along the illuminated strip, depending upon the illuminator architecture. Irregularities in the illumination level in the illuminated area can result in defects in the image data, particularly in the case of discrete light sources, such as LEDs. While light guides are able to focus light with high efficiency on the imaging area of the platen, it has been found that glossy document surfaces that are uneven, e.g., crumpled or curved from the platen, may specularly reflect the light toward the photosensitive device unevenly, resulting in bright spots in the image.

In a practical application of document scanning, specular flare light is created when a combination of conditions (such as a glossy document not lying perpendicular to the optical axis of the imaging lens) enables a portion of the light from the illumination source to specularly reflect into the imaging sensor and add to its signal output. The specular flare light is an undesired addition to the light signal picked up from the light diffused by the document. This creates an artifact that may or may not be objectionable to customers depending upon the conditions. The artifact is usually noticeable on edges along the fast scan direction (potentially both leading and trailing edges). The glossier the document, and the darker the image content, the more the specular flare artifact is enhanced. For uniform sources, such as fluorescent lamps, the specular flare artifact is usually a continuous line; for discrete sources, such as LED arrays, the specular flare artifact is discontinuous and periodic, often appearing as bright spots in the image.

SUMMARY

According to one aspect, there is provided an optical element for transmitting light emitted from a linear array of light sources. The optical element includes a light-transmissive member, having a refractive index of about 1.4 to about 1.8, and defining an entry surface for disposal near the light sources, the entry surface defining at least one set of prisms, an exit surface, and a section of a DCPC between the entry surface and the exit surface.

According to another aspect, there is provided an apparatus for recording an image on a sheet, comprising a linear array of light sources and an optical element for transmitting light emitted from the linear array of light sources. An optical element extends along the linear array of light sources for directing light from the light sources to the sheet, the optical element defining an entry surface disposed near the light sources. The entry surface defines at least one set of prisms. Collection optics receive light reflected from the sheet, the collection optics defining an acceptance angle. Each prism of the set of prisms defines an angle whereby light exiting the optical element is outside the acceptance angle of the collection optics

DETAILED DESCRIPTION

Aspects of the exemplary embodiment relate to an optical element and to a document scanning apparatus or "scanner" which incorporates the optical element. The exemplary embodiment also relates to a method of scanning physical documents for generating scanned images. The documents to be scanned may comprise sheets of paper or other flexible substrate, on which an image or images to be scanned is disposed. The scanner may form a part of an imaging device, such as a stand-alone scanner, a copier, a facsimile machine, or a multifunction device, in which a scanned image is rendered on paper and/or stored in digital form, for example, for display, processing, or transmission in digital form.

Figure 1:
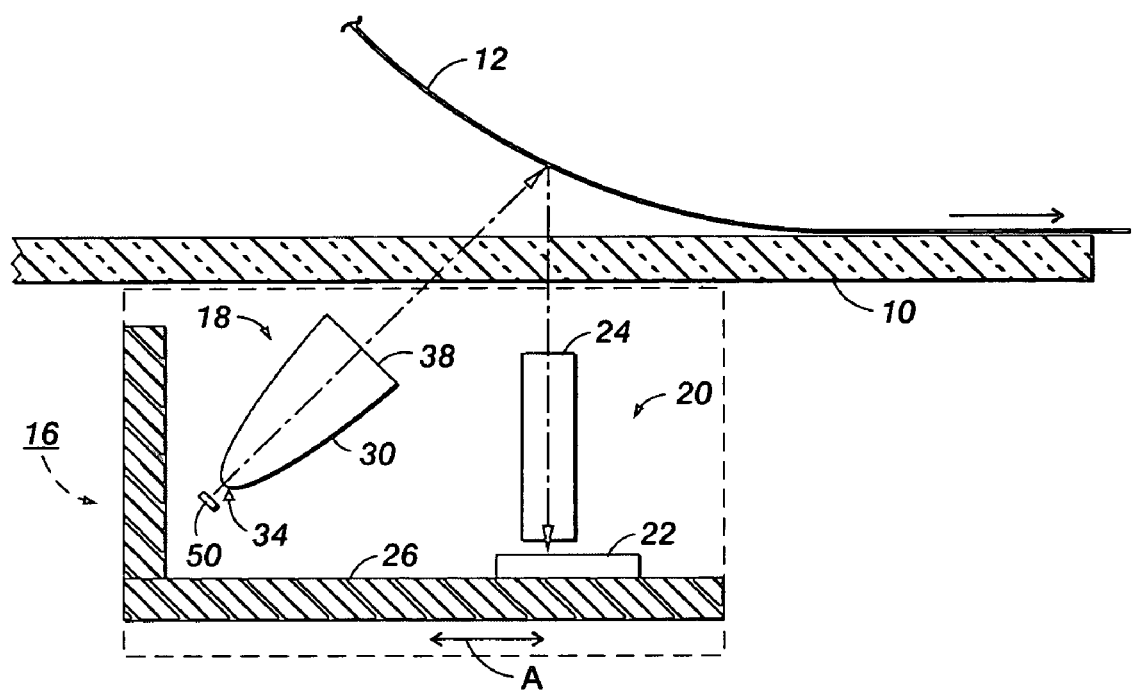
FIG. 1 is a simplified elevational view of a document scanner.

With reference to FIG. 1, a document scanner includes a platen 10, which may have distinct parts, on which a document sheet 12 can be placed for recording therefrom. Optionally, associated with platen 10 is a document handler (not shown), which sequentially feeds sheets from a multi-page original document. Normally the document 12 lies flat on the platen. It is shown curved in FIG. 1 to indicate specular reflection conditions that might exist at the edge of a book or if the document is crumpled or otherwise curved.

A scan head 16 is positioned to illuminate the document and includes an illuminator 18 and a detector 20. The detector includes a photosensitive device 22 and a lens arrangement 24. Light from a linear array of light sources 50 (shown end-on in the Figure) travels through an optical element 30, which will be described in detail below, and illuminates a thin strip of the document.

The detector includes a suitable processing device (not shown) for generating an image comprising signals representative of reflected light recorded by the photosensitive device. The photosensitive device 22, which includes one or more linear arrays of photosensors, records the reflected light. The photosensors may comprise solid-state devices, such as CCD (charge coupled device) or CMOS (complementary metal oxide semiconductor) devices. The lens arrangement 24, such as a SELFOC® lens or other microlens arrangement with a predetermined acceptance angle θ, is interposed between the platen 10 and the photosensitive device 22 for focusing the reflected light on the photosensor array. The scan head 16 can be mounted on a moveable carriage 26, for recording light reflected from images on sheets placed on the main portion of platen 10. In general, the carriage translates in direction A, as shown in FIG. 1.

Figure 2:
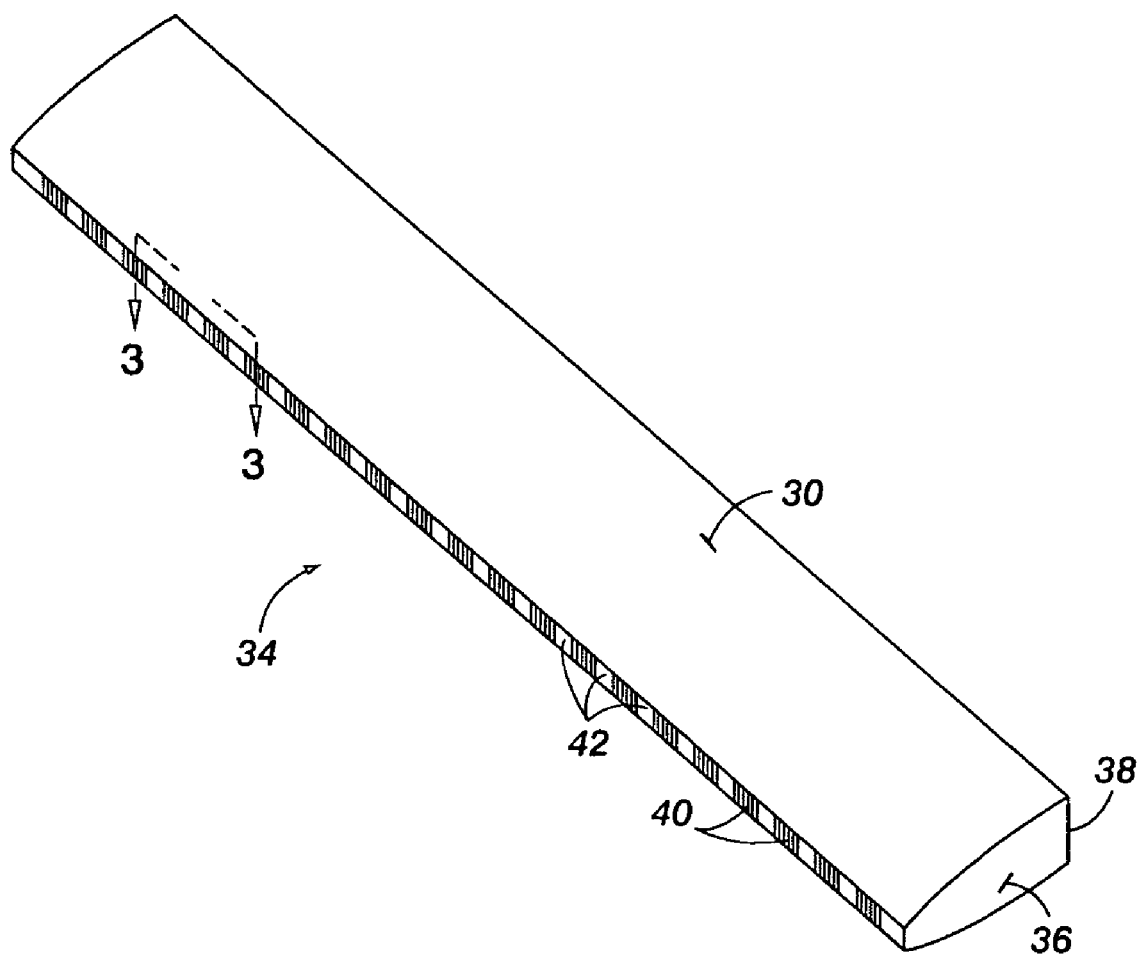
FIG. 2 is a perspective view of one embodiment of an optical element (light guide), in isolation, for the document scanner of FIG. 1.

FIG. 2 is a perspective view of one embodiment of an optical element, in isolation, for the document scanner of FIG. 1. The optical element 30 is formed from a single piece of light-transmissive material, such as glass or plastic, having a refractive index of about 1.4 to about 1.8 (a typical plastic used in this context has a refractive index of about 1.52). Element 30 defines an entry surface generally indicated as 34 and an exit surface generally indicated as 38. In this embodiment, the cross-section such as 36 of the element 30 defines at least a section of a DCPC (dielectric compound parabolic concentrator), as such an optical element is described in, for example, U.S. patent application Ser. No. 11/409,109, referenced above. In brief, the DCPC relies on total internal reflection to provide a desirable arrangement of beams emerging from the exit surface 38.

Figure 3:
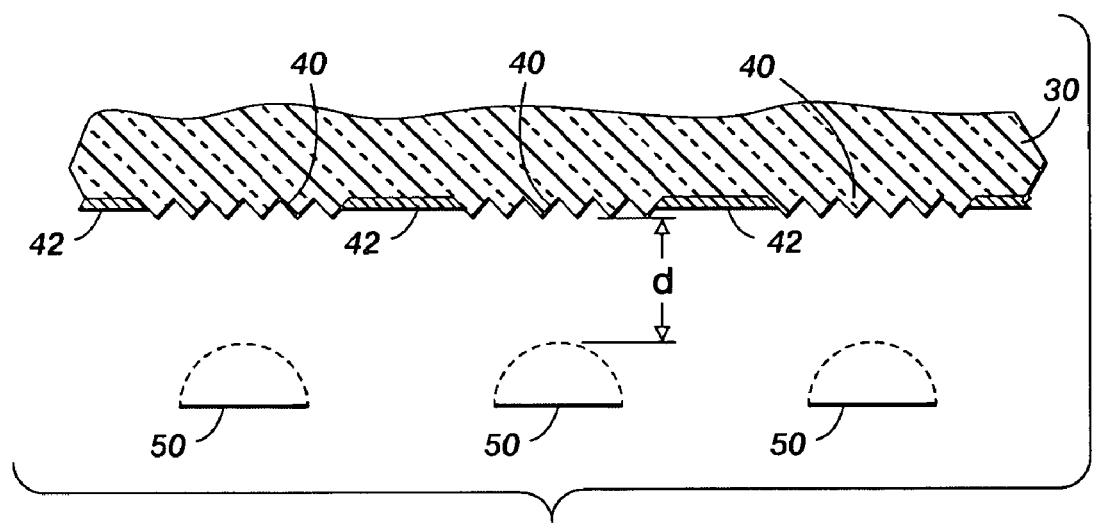
FIG. 3 is a sectional view, through line 3-3 in FIG. 2.

Defined in the entry surface 34 is a plurality of sets of prisms. FIG. 3 is a sectional view, through line 3-3 in FIG. 2, giving a detailed view of some sets of prisms. (The prisms can effectively be formed by molding or cutting ridges in the body of element 30, creating the prisms between the ridges.) Element 30 extends in a direction corresponding to the linear array 50 of light sources, and each prism is oriented, as shown, in a direction perpendicular to the direction along the linear array. Each set of prisms 40 is placed to be adjacent a light source 50 providing light into entry surface 34. The distance d between the surface of each LED 50 and the set of prisms 40 should be less than 2 mm, and in some instances the LED 50 can contact the prisms.

In practical embodiments, the sets 40 of prisms alternate with gap regions 42, which might be painted or otherwise coated with a coating of about 80% reflectivity, with regard to light traveling within element 30.

Figure 4:
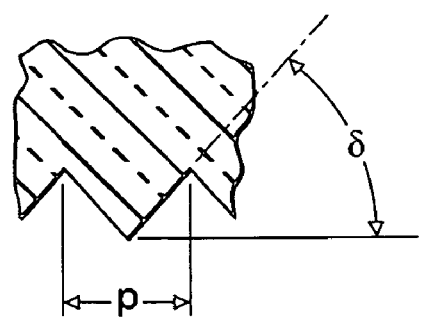
FIG. 4 is a sectional view showing a detail of FIG. 3.

FIG. 4 is a detailed view of a single prism 44 defined by adjacent ridges in a set of prisms 40. The base p of each prism 44 should be about 0.2 mm to about 1.0 mm in length. Each prism 44 defines an angle δ, defined relative to the horizontal line as shown. The angle δ is chosen such that, in case of specular reflection, the light exiting the light guide is outside the collection of the angle of the lens or optics used in the scanner. This angle is typically 48 degrees or higher if an SLA-09 lens is used. For SLA-12 and SLA-20 lenses the δ values are equal to or higher than 52° and 55°, respectively. In case a spherical lens in place of a SELFOC® lens is used, the prism angle will be chosen such that the light coming out of the light guide is outside the acceptance angle of that lens.

Because of limitations of the manufacturing process, a prism with very sharp corners may not be possible, but it will have rounded or flat corners. The radius of the corners formed by each prism 44 and between each prism 44 should be as small as possible.

The length of each set 40 of prisms along the element 30 should extend beyond the LED 50 corresponding to the set on both sides, and in the present embodiment could be up to four times the length of the LED 50. In overview, the embodiment provides an illumination system whereby specular flare effects, such as from a glossy original image, or an image not in direct contact with platen 10, can be minimized while the diffuse component of light is not affected. In particular, the DCPC, as disclosed in U.S. patent application Ser. No. 11/409,109, maximizes the amount of light transferred from the LED sources to the document plane. The prisms ensure that the light reaching the document plane has angles greater than the acceptance angle of the imaging lens, thus ensuring that any specularly-reflected light is not imaged by the lens. A SELFOC® lens has a very well defined, and not too large, acceptance angle at each point along the lens, so the prism design is relatively uniform. In a practical application, the angle δ on any portion of the prism must be greater than 48°; otherwise light would be transmitted within the acceptance angle of the SELFOC® lens. This means other surface relief structures in the prior art, such as dimples, etc., that have some portion of the surface slope less than the minimum angle for avoiding transmission of light within the acceptance angle of the SELFOC® lens, will not work as efficiently.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An optical element for transmitting light emitted from a linear array of light sources, the optical element comprising:
   a light-transmissive member, having a refractive index of about 1.4 to about 1.8, and defining
   an entry surface for disposal near the light sources, the entry surface defining a plurality of sets of prisms, each set of prisms disposed to be adjacent a light source,
   an exit surface, and
   a section of a DCPC (dielectric compound parabolic concentrator) between the entry surface and the exit surface.

2. The optical element of claim 1, each prism defining an angle greater than about 48°.

3. The optical element of claim 1, the optical element extending in a first direction corresponding to the linear array of light sources, and each prism being oriented in a direction perpendicular to the first direction.

4. The optical element of claim 1, the entry surface defining gaps between adjacent sets of prisms.

5. The optical element of claim 4, each gap being at least partially reflective of light traveling within the element.

6. The optical element of claim 5, each gap having about an 80% reflectance.

7. The optical element of claim 1, each prism defining a pitch of no more than about 1.0 mm.

8. An apparatus for recording an image on a sheet, comprising:
   a linear array of light sources;
   an optical element extending along the linear array of light sources for directing light from the light sources to the sheet, the optical element defining an entry surface disposed near the light sources, the entry surface defining a plurality of sets of prisms, each set of prisms disposed to be adjacent a light source, the entry surface defining gaps between adjacent sets of prisms; and collection optics for receiving light reflected from the sheet, the collection optics defining an acceptance angle;

each prism of the set of prisms defining an angle whereby light exiting the optical element is outside the acceptance angle of the collection optics.

9. The apparatus of claim 8, each prism being oriented in a direction perpendicular to the linear array of light sources.

10. The apparatus of claim 8, each prism defining a pitch of no more than about 1.0 mm.

11. The apparatus of claim 8, the optical element further defining an exit surface, the element defining a section of a DCPC (dielectric compound parabolic concentrator) between the entry surface and the exit surface, a distance between each light source and an adjacent set of prisms being less than about 2 mm.

12. The apparatus of claim 8, each gap being at least partially reflective of light traveling within the element.

13. The apparatus of claim 12, each gap having about an 80% reflectance.

14. The apparatus of claim 8, the collection optics including a SELFOC® lens.

15. The apparatus of claim 14, the SELFOC® lens being an SLA-09 lens, and the angle of each prism being not less than about 48°.

16. The apparatus of claim 14, the SELFOC® lens being an SLA-12 lens, and the angle of each prism being not less than about 52°.

17. The apparatus of claim 14, the SELFOC® lens being an SLA-20 lens, and the angle of each prism being not less than about 55°.

18. The apparatus of claim 8, further comprising a photosensitive device for receiving light from the collection optics.

* * * * *